(12) United States Patent
Ward (10) Patent No.: US 6,698,942 B2
(45) Date of Patent: Mar. 2, 2004

(54) CAMERA MOUNT (76) Inventor: Jeffery Scott Ward, 429 Hill St., Parkersburg, WV (US) 26104

( * ) Notice: Subject to any disclaimer, the term of this patent is extended or adjusted under 35 U.S.C. 154(b) by 40 days.

(21) Appl. No.: 10/081,932

(22) Filed: Feb. 20, 2002

(65) Prior Publication Data

US 2003/0156836 A1 Aug. 21, 2003

(51) Int. Cl.[7] .............................................. G03B 17/00
(52) U.S. Cl. ...................... 396/421; 396/424; 396/427; 396/428
(58) Field of Search ................. 396/419, 421, 396/422, 424, 427, 428

(56) References Cited

U.S. PATENT DOCUMENTS 3,706,437 A * 12/1972 Eberhardt ................ 248/230.4
6,244,759 B1 * 6/2001 Russo ......................... 396/428

OTHER PUBLICATIONS

Cabela's Tripod, Cabela's 40th Anniversary, Master Catalog, FALL 2001, p. 554, Edition II Sidney, Nebraska, USA.
Tree Stand Video Pod, Recluse Hunting Products pamphlet p. 3, issue No. 417.849.2596, Springfield, MO, USA.
Redi–Reach Bow holder with camera mount, Cabela's 40th Anniversary Master Catalog, FALL 2001, p. 430, Edition II, Sidney, Nebraska, USA.

* cited by examiner

Primary Examiner—Russell Adams
Assistant Examiner—Rochelle Blackman (57) ABSTRACT A mount for use in the outdoors to support a camera for recording images of flora, fauna, and participants in outdoors-recreational activities. The camera mount comprises a pivot and a rotatable support plate atop a clamping mechanism, which will clamp upon square, rectangular, and round shaped shafts. A camera is statically fastened to the rotatable support plate by a thumbscrew extending through a round hole and tightened. The pivot and rotatable support plate mount to the clamping mechanism with a bolt extending through holes aligned in each and a threaded knob, that when tightened or loosened on the bolt adjusts compressive tension on the clamping mechanism; also, securing the desired angle of rotation. An embodiment is shown of an alternate position of the bottom of the clamping mechanism for mounting on smaller round shafts. A method of mounting a camera for use in the recording of flora, fauna, and participants in outdoors-recreational activities is disclosed.

9 Claims, 5 Drawing Sheets

CAMERA MOUNT

STATEMENT REGARDING FEDERALLY SPONSORED RESEARCH & DEVELOPMENT

Not Applicable

SEQUENCE LISTING

Not Applicable

BACKGROUND OF THE INVENTION

1. Technical Field

The present invention relates to mounts for still cameras and video camera recorders. More particularly, the present invention relates to a camera mount for use in the outdoors.

2. Description of Related Art

Still cameras, and most recently video camera recorders, have facilitated the recording and display of flora, fauna, and participants in outdoors recreational activities. During the recording of these images, cameras have been mounted to various devices. These devices include stationary styled mounts with angular adjustment and adjustable arm styled mounts with pan able rotation. The ability to position a camera stationary at various angles, as well as, rotate while recording affords the recorder opportunities to record images from various views.

Various devices have been utilized for mounting a camera to photograph flora, fauna, and participants in outdoors-recreational activities. One example is the stationary-telescoping tripod styled mount. These mounts generally have three adjustable length legs for support and a camera support capable of rotating or being fixed at a variety of angles. While these mounts function to support a camera for photographing various views while the photographer is sitting or standing firmly upon the ground, there are drawbacks to their use. This type of mount is not easily useable upon a tree stand platform or extremely uneven ground and generally has no means of being fastened to the object it sits upon.

Another such example is the telescoping tubular styled mounts. While these mounts function to support a camera for photographing various views while sitting or standing upon a tree stand platform, there are drawbacks to their use. Most of these mounts are designed for static attachment to a tree stand platform. They have a telescoping tube attaching a rotating camera support to a base that is bolted to the object on which it sits. This last feature can become a hindrance as the photographer on a tree stand platform has a limited area upon which to sit or stand and these mounts can be difficult to relocate. They are not generally for use in a ground level situation and have no other means of attachment to an object.

Another such example is the adjustable arm styled mount. These mounts are designed to be statically affixed to an object while allowing the photographer to easily relocate the position of the camera by adjustment of the arm. They do not require an alternative attachment means. While these mounts function to support a camera for photographing various views, there are drawbacks to their use. This style of mount is relatively complicated to use in comparison with the mounts in the previous examples.

While the different styles of mounts in the previous examples function to support a camera for photographing various views, they have some common drawbacks. These mounts are bulky in size by nature. This may present problems resulting in breakage during transportation in the outdoors. By being bulky in size, they each also have a defined weight that is to be considered when traveling greater distances in the outdoors.

Therefore, there is a need in the art for an improved camera mount and clamping mechanism, which is lightweight, compact, and easy to relocate.

BRIEF SUMMARY OF THE INVENTION

The present invention meets the needs in the art by providing an improved camera mount and clamping mechanism for supporting a camera in the outdoors for the recording and display of flora, fauna, and participants in outdoors-recreational activities.

The present invention has a rotational ability built into the camera mount's support plate comprising a semi-spherical projection having parallel concave and convex surfaces at it's underside. The support plate's semi-spherical projection further defines a large radius hole for a threaded fastener with a hexagonal head to extend through that allows clearance around the threaded fastener. This clearance defines the maximum angle of rotation attainable during use of the camera mount. A semi-spherical pivot with a centrally located hole for a threaded fastener to extend through and has a convex surface that is cooperatively mated to the concave surface of the semi-spherical projection.

An upper clamping plate defining a cylindrical pivot seat having a concave surface and a hole for a threaded fastener to extend through is cooperatively mated to the convex surface of the semi-spherical projection. A threaded fastener extends through the aforementioned parts of the invention and with the semi-spherical surfaces of the pivot and pivot seat and being coaxially static to the fastener allow the support plate to rotate upon the support plate's semi-spherical projection.

The present invention also provides an improved clamping mechanism whereby the camera mount can be disposed upon various objects allowing greater flexibility of use. The clamping mechanism has an upper clamping plate and a lower clamping plate. The upper clamping plate defining a planar surface with a perpendicular lip, and the planer surface bears on the surface of the desired object the camera mount is to be disposed upon. The lower clamping plate defining two horizontally parallel planar surfaces, above a centrally located horizontal plane, with two opposing surfaces perpendicular to and between the two horizontally parallel planar surfaces further defining a notch which forms the first bearing surface defined by the lower clamping plate.

The upper clamping plate's bearing planar surface and lower clamping plate's bearing planar surface each further define a V-shaped groove across their face, that are coaxially aligned, comprising additional surfaces to bear upon the desired object.

The lower clamping plate also defines a horizontal planar surface below the centrally located horizontal plane which contains a radial groove across it's face that when the lower clamping plate is inverted, is coaxially aligned with the upper clamping plate's V-shaped groove, comprising additional surfaces to bear upon the desired object.

The present invention also provides ease of relocation by further comprising a compressive tension adjustment knob that has coaxially aligned threads that cooperatively mate with the threads of the threaded fastener. With the fastener extending through the pivot, support plate, upper clamping plate, lower clamping plate, and threaded knob, all parts of the camera support and clamping mechanism comprise the camera mount and are able to be easily disposed upon or removed from the desired object by tightening or loosening the compressive tension adjustment knob and increasing or relieving the compressive tension of the clamping mechanism.

The present invention is compact and by being so is also lightweight providing ease of transportation.

Upon reading the claims and detailed description of the invention, and upon viewing the drawings, the objects, features, and advantages of the present invention will be apparent.

DETAILED DESCRIPTION OF THE DRAWINGS

Figure 1:
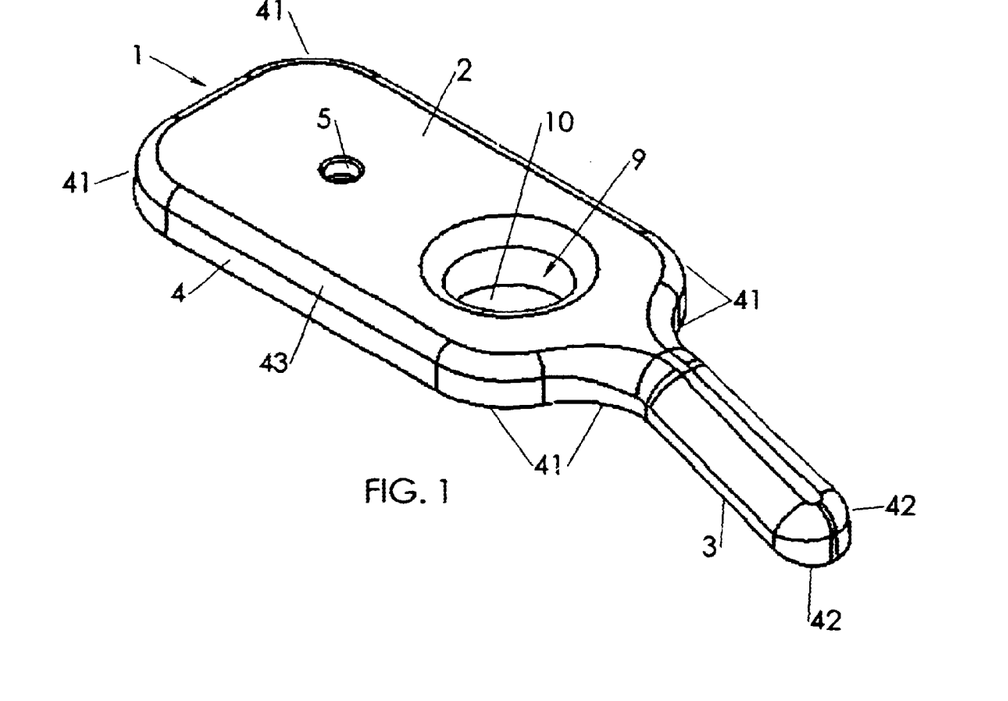
FIG. 1 is a top view in perspective of a preferred embodiment of the camera mount support plate, according to my new invention.

Referring now in more detail to the drawings where like parts are identified alike, FIG. 1 illustrates a top perspective view of the camera mount's support plate 1 for use in the outdoors, according to my new invention. The support plate 1, an injection molded thin-part that defines a horizontal planar surface 2 for supporting a camera (not illustrated), with an angled handle 3 extending from one end upon a centrally located horizontal axis. The support plate 1 defines a hole 5 along a centrally located horizontal axis. The support plate 1 defines radial inner and outer corners 41 that have equal radii. The support plate's angled handle 3 defines radial outer corners 42. The support plate 1 defines a lip 4 around the support plate 1 and angled handle 3 perimeter that is perpendicular to the support plate's horizontal planar surface 2. The support plate's lip 4 that is perpendicular the support plate's horizontal planar surface 2 defines a radial edge 43 around the support plate 1 and angled handle 3 perimeter. The support plate 1 defines a semi-spherical projection 9 along a centrally located horizontal axis, with it's radial axis disposed on a plane vertically below and parallel to the support plate's horizontal planar surface 2. The semi-spherical projection 9 defines a concave surface 10.

Figure 2:
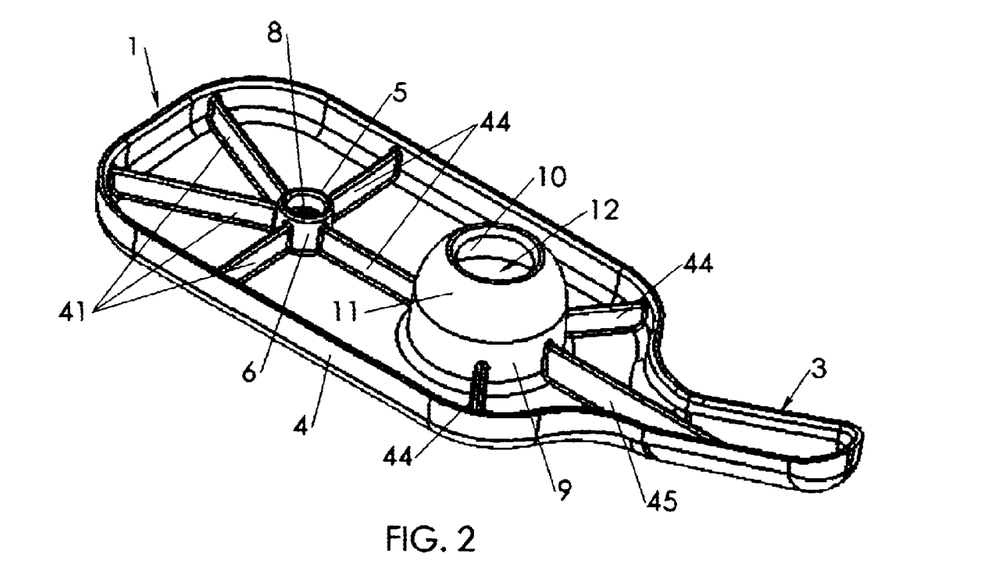
FIG. 2 illustrates a bottom view in perspective of the of the camera mount support plate.

FIG. 2 illustrates a bottom perspective view of the camera mount's support plate 1, an injection molded thin-part containing a hole 5 that defines a perpendicular cylindrical side 6 for a threaded fastener (not illustrated) to extend through for statically attaching camera (not illustrated) to the support plate 1. The cylindrical side 6 defines a vertically centered cylindrical rib 8 to retain the threaded fastener (not illustrated).

The support plate 1 further comprises a semi spherical projection 9 that defines a convex surface 11 which is parallel to the semi-spherical projection's concave surface 10. The semi-spherical projection 9 defines a centrally located hole 12 for a threaded fastener with a hexagonal head (not illustrated) to extend through. The support plate semi-spherical projection's hole 12 partially removes the side of the semi-spherical projection 9 that is parallel to the support plate's horizontal planar surface 2 at an angle originating from the radial axis of the semi-spherical projection 9 defining clearance around the threaded fastener with a hexagonal head (not illustrated).

The support plate 1 defines structural ribs 44 that connect the semi-spherical projection 9, the hole's perpendicular cylindrical side 6, and the support plate and angled handle's perimeter lip 4 in a static relationship. The support plate 1 defines a structural rib 45 to strengthen the angled handle 3.

Figure 3:
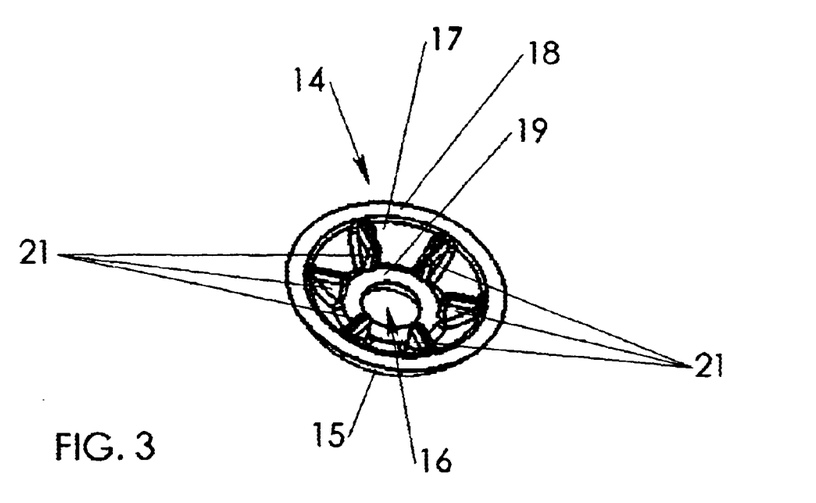
FIG. 3 illustrates a perspective view of the semi-spherical pivot.

FIG. 3 illustrates a perspective view of the camera mount's semi-spherical pivot 14, an injection molded thin-part that defines a convex outer surface 15 that bears against the concave surface of the support plate's semi-spherical projection (not illustrated). The semi-spherical pivot 14 defines a centrally located hole 16 for a threaded fastener with a hexagonal head (not illustrated) to extend through.

The semi-spherical pivot 14 defines a concave side 17 by a first face 18 and a second face 19 which are parallel to a plane on a horizontal axis and perpendicular to the support plate's hole 16, with the first face 18 disposed on a horizontal plane which is vertically above the horizontal plane of the second face 19. The concave side 17 forms a relief to receive a hexagonal fastener head (not illustrated). The semi-spherical pivot 14 defines a polar array of six ribs 21, which originate at the outermost radius of the concave side 17 and project centrally upon a vertical axis and perpendicular to the hexagonal fastener head (not illustrated), restricting rotational movement of the hexagonal fastener head (not illustrated).

Figure 4:
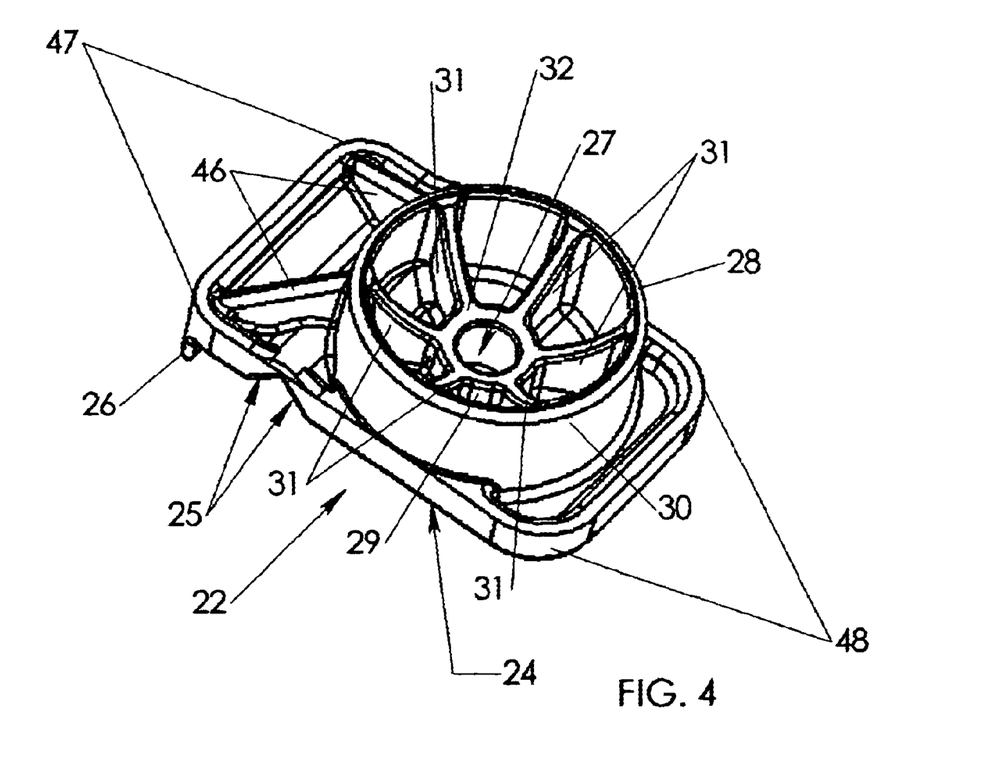
FIG. 4 illustrates a perspective view of the upper clamping plate.

FIG. 4 illustrates a perspective view of the camera mount upper clamping plate 22, an injection molded thin-part that defines a horizontal planar surface 24 that bears against the surface of the desired object (not illustrated) the upper clamping plate 22, is to be disposed upon. The upper clamping plate's horizontal planer surface 24 defines mirrored angled surfaces 25 by a first face and a second face which are mirrored upon a vertical axis that is perpendicular to the upper clamping plate's horizontal planar surface 24. The angled surfaces 25 are disposed on a plane that is vertically above and parallel to the upper clamping plate's horizontal planar surface 24 and the mirrored angled surfaces 25 bear against the surface of the object (not illustrated) the upper clamping plate 22, is to be disposed upon.

The upper clamping plate 22 defines a lip 26 perpendicular to the upper clamping plate's horizontal planar surface 24. The upper clamping plate 22 defines a hole 27 along a centrally located horizontal axis and perpendicular to the upper clamping plate's horizontal planar surface 24 for threaded fastener with a hexagonal head (not illustrated) to extend through.

The upper clamping plate 22 defines radial outer corners 47 that have equal radii. The upper clamping plate 22 defines radial outer corners 48 that have equal radii. The upper clamping plate 22 defines mirrored ribs 46 to strengthen the lip 26.

The upper clamping plate 22 defines a cylindrical pivot seat 28 having a first cylindrical side extending to a horizontal plane vertically above and parallel to the upper clamping plate's horizontal planar surface 24 on an axis that is perpendicular to the upper clamping plate's horizontal planar surface 24, and its radial axis is same as the fastener hole 27 defining a lip 29 around the fastener hole 27 perimeter.

The upper clamping plate's cylindrical pivot seat 28 defines a second cylindrical side 30 parallel to the fastener hole lip 29 extending from the upper clamping plate's horizontal planar surface 24 to a horizontal plane vertically above the horizontal plane the fastener hole lip 29, and its radial axis is same as the fastener hole 27. The upper clamping plate's cylindrical pivot seat 28 defines a polar array of six ribs 31, which originate at the innermost radius of cylindrical side 30 and project centrally upon a vertical axis and perpendicular to the upper clamping plate's horizontal planar surface 24 to the outermost radius of the fastener hole lip 29. The cylindrical pivot seat's polar array of six ribs 31 define a concave surface 32 that bears against the semi-spherical projection's convex surface (not illustrated) by originating at the upper clamping plate's horizontal planar surface 24 and extending vertically to the horizontal plane of the fastener hole lip 29 and continuing on a radial axis parallel to the radial axis of the semi-spherical projection (not illustrated) to the horizontal plane of the cylindrical side 30.

Figure 5:
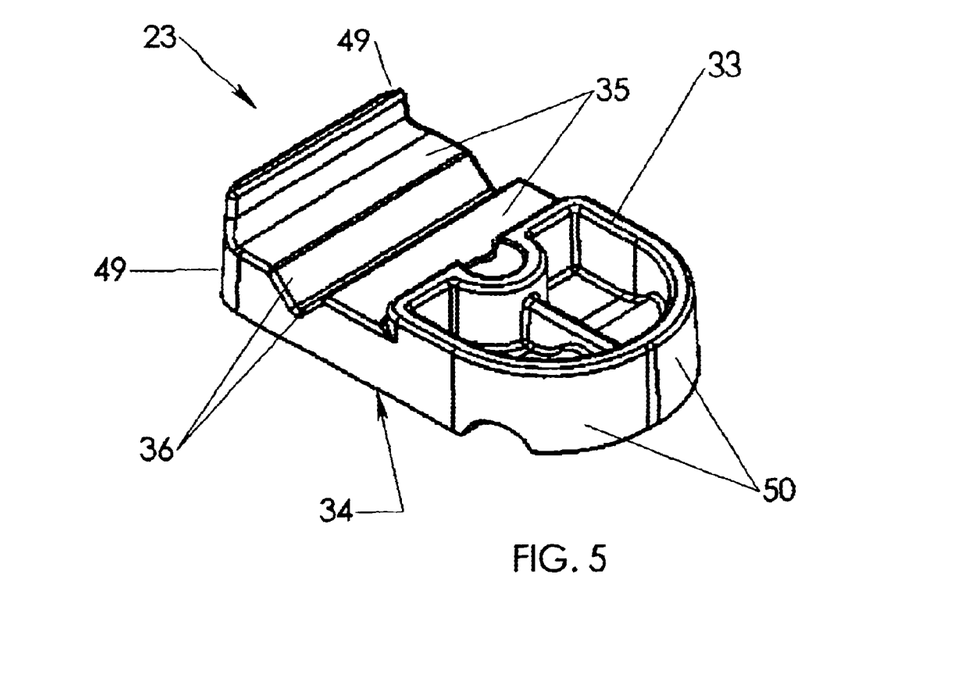
FIG. 5 illustrates a perspective view of a first position of the lower clamping plate.

FIG. 5 illustrates a perspective view of the camera mount lower clamping plate 23, an injection molded thin-part that defines opposing horizontal planar surfaces by a first face and a second face that are parallel upon a vertical axis to a plane on a horizontal axis with the first face being the lower clamping plate's first horizontal planar surface 33 and the second face being the lower clamping plate's second horizontal planar surface 34.

The lower clamping plate 23 defines radial outer corners 49 that have equal radii. The lower clamping plate 23 defines radial outer corners 50 that have equal radii.

The lower clamping plate 23 defines a notch with a horizontal planar surface 35 by opposing sides with a first face and a second face that are parallel to a plane on a horizontal axis, when the first face is the lower clamping plate's first horizontal planar surface 33 and the second face is on a horizontal plane vertically below the plane of the lower clamping plate's first horizontal planar surface 33. The opposing sides define a notch, and the lower clamping plate's second face is the notch's horizontal planar surface 35 that bears against the surface of the object (not illustrated) the lower clamping plate 23, is to be disposed upon.

The lower clamping plate notch's horizontal planar surface 35 defines mirrored angled surfaces 36 by a first face and a second face that are mirrored on a vertical axis located below and perpendicular to the lower clamping plate notch's horizontal planar surface 35, and the mirrored angled surfaces 36 bear against the surface of the object (not illustrated) the lower clamping plate 23, is to be disposed upon.

Figure 6:
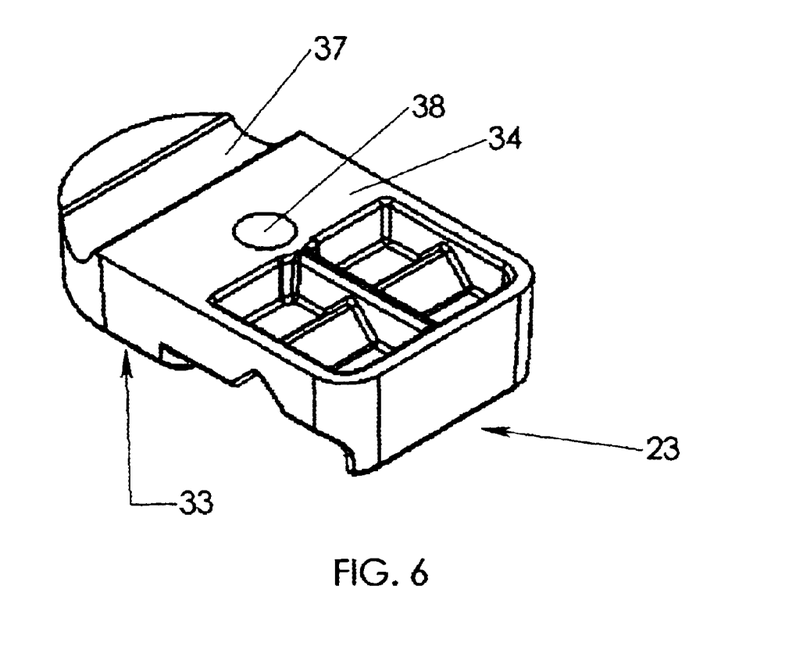
FIG. 6 illustrates a perspective view of a second position of the lower clamping plate.

FIG. 6 illustrates a perspective view of the camera mount lower clamping plate's second horizontal planar surface 34 defining a cylindrical surface 37 on a radial axis with the radial axis originating on the horizontal axis of the lower clamping plate's second horizontal planar surface 34, and the lower clamping plate's cylindrical surface 37 bears against the surface of the object (not illustrated) the lower clamping plate 23, is to be disposed upon.

The lower clamping plate defines a hole 38 on a vertical axis along a centrally located horizontal axis perpendicular to the lower clamping plate's horizontal planar surfaces 33 and 34 for the threaded fastener with a hexagonal head (not illustrated) to extend through.

Figure 7:
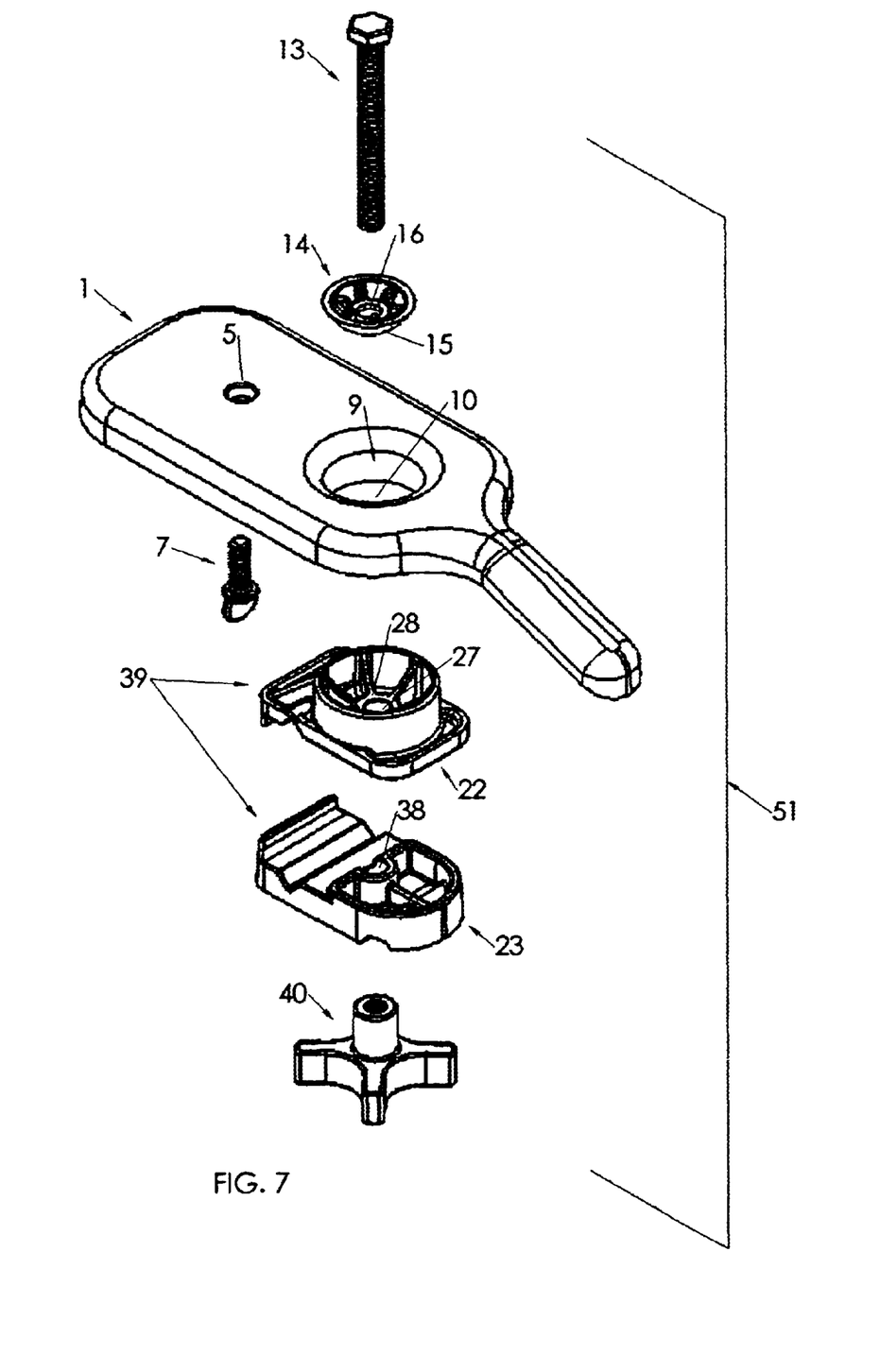
FIG. 7 illustrates an exploded view in perspective, of the preferred embodiment of a camera mount, according to my new invention.

FIG. 7 illustrates an exploded prospective view of the preferred embodiment of a camera mount 51, according to my new invention. The camera mount 51 comprises a threaded fastener 13, a support plate 1 with a semi-spherical projection 9, a semi-spherical pivot 14, a clamping mechanism 39 that defines an upper clamping plate 22 and a lower clamping plate 23, a threaded knob 40 and a threaded fastener with a hexagonal head 7.

A camera (not illustrated) is statically attached to the support plate 1 with threaded fastener 7 extending through the support plate's hole 5. The semi-spherical pivot's convex outer surface 15 bears against the support plate's semi-spherical projection's concave surface 10 and the support plate's semi-spherical projection's convex surface (not visible) bears against the upper clamping plate's cylindrical pivot seat 28 allowing the support plate to be rotatable.

The threaded fastener with a hexagonal head 13 extends through the semi-spherical pivot's hole 16, the support plate's semi-spherical projection's hole 12 (not visible), the upper clamping plate's hole 27, the lower clamping plate's hole 38, and the threaded knob 40 connecting the clamping mechanism 39 to the support plate 1.

Figure 8:
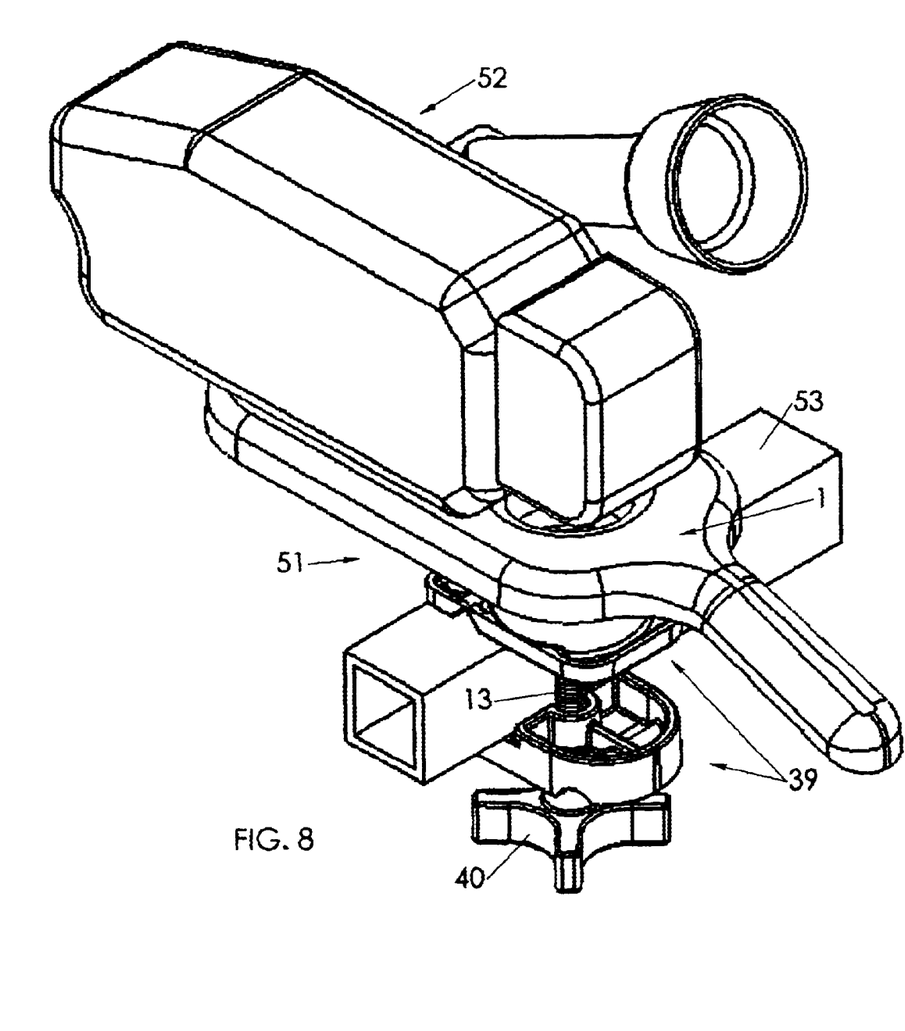
FIG. 8 illustrates a perspective view of the preferred embodiment of a camera mount in operation, according to my new invention.

FIG. 8 illustrates a perspective view of the preferred embodiment of a camera mount 51, according to my new invention.

In operation a camera 52 (for illustration) is statically attached to the support plate 1 with threaded fastener 7 (not visible). The camera mount 51 is disposed upon a square shaft 53 (for illustration).

While the clamping mechanism 39 is disposed upon the square shaft 53 (for illustration), the compressive tension of the clamping mechanism 39 and rotation angle of the support plate 1 are controlled by loosening or tightening the threaded knob 40 on the threaded fastener 13. Depending on the amount of this tension, the support plate 1 may be held statically or be rotatable.

In the foregoing specification, the preferred embodiments, modes of operation, and principles of the present invention have been disclosed. The invention should not be limited by the previous disclosures as they are intended for illustration, and not for restriction. Those skilled in the art may change or vary the present invention without departing from the true intention of the present invention described in the claims that follow.

What is claimed is:

1. A camera mount for use in the outdoors to support a camera for recording images of flora, fauna, and participants in outdoors-recreational activities, said mount comprising a support plate defining a horizontal planar surface for supporting a camera thereon with an angled control handle extending from one end upon a centrally located horizontal axis having vertical sides perpendicular to said support plate's horizontal planar surface, defining a lip around said support plate and angled handle's perimeter, the camera mount further comprising:

a means for attaching a camera to said support plate comprising a hole upon a first vertical axis and along said centrally located horizontal axis for a threaded fastener to extend through defining a cylindrical side extending vertical from and perpendicular to the support plates horizontal planar surface defining a lip around the fastener hole perimeter whereby said support plate's threaded fastener hole's said cylindrical side defines a centrally located cylindrical rib to retain said threaded fastener for securing a camera statically to said support plate;

a means for connecting a clamping mechanism comprising an upper clamping plate and a lower clamping plate to the support plate defining a semi-spherical projection comprising parallel concave and convex surfaces with a centrally located hole for a threaded fastener with a hexagonal head to extend through upon a second vertical axis and along said centrally located horizontal axis; and a means of rotation of the support plate comprising a semi-spherical pivot defining a convex outer surface which bears against said concave surface of said support plates semi-spherical projection and an upper clamping plate comprising a cylindrical pivot seat defining a concave surface that bears against said convex surface of said support plate's semi-spherical projection.

2. The camera mount as recited in claim 1, wherein said semi-spherical projection further defines a radial axis that is disposed on a plane vertically below and parallel to said support plate's horizontal planar surface;

the semi-spherical projection's hole partially removes the side of said semi-spherical projection that is parallel to said support plate's planar surface at an angle originating from said radial axis of said semi-spherical projection defining clearance around said threaded fastener with a hexagonal head.

3. The camera mount as recited in claim 1, wherein the semi-spherical pivot further defines a;

a centrally located hole for said threaded fastener with a hexagonal head to extend through;

the semi-spherical pivot defines a concave side by a first face and a second face which are parallel to a plane on a horizontal axis and perpendicular to said hole, said first face being disposed on a horizontal plane which is vertically above the horizontal plane of said second face, whereby said concave side defines a relief to receive said hexagonal fastener head; and the semi-spherical pivot defines a polar array of six ribs, which originate at the outermost radius of said concave side and project centrally upon a vertical axis and perpendicular to said hexagonal fastener head, thereby restricting rotational movement of said hexagonal fastener head.

4. The camera mount as recited in claim 1, wherein said clamping mechanism's upper clamping plate further defines a horizontal planar surface which bears against the surface of the desired object said clamping mechanism is to be disposed upon;

the upper clamping plate's horizontal planar surface defines mirrored angled surfaces by a first face and a second face which are mirrored upon a vertical axis and said vertical axis being perpendicular to said upper clamping plate's horizontal planar surface, said mirrored angled surfaces being disposed upon a plane upon a horizontal axis which is vertically above and parallel to the horizontal axis of said upper clamping plate's horizontal planar surface, whereby said mirrored angled surfaces bear against the surface of the desired object said upper clamping plate is to be disposed upon;

the upper clamping plate defining a side by a first face and a second face which are parallel to a plane on a horizontal axis, said first face being said upper clamping plate's horizontal planar surface, said second face being disposed on a plane vertically below the plane of said first face, whereby said side defines a lip perpendicular to said upper clamping plate's horizontal planar surface; and the upper clamping plate defining a hole upon a vertical axis along a centrally located horizontal axis and perpendicular to said upper clamping plate's horizontal planar surface for said threaded fastener to extend through.

5. The camera mount as recited in claim 1, wherein said upper clamping plate's cylindrical pivot seat further defines a first cylindrical side extending to a horizontal plane vertically above and parallel to said upper clamping plate's horizontal planar surface upon a vertical axis perpendicular to said upper clamping plate's horizontal planar surface, and said vertical axis is same said vertical axis of said threaded fastener hole defining a lip around said fastener hole perimeter, the cylindrical pivot seat defines a second cylindrical side parallel to said first cylindrical side extending to a horizontal plane vertically above said horizontal plane of said first cylindrical side and parallel to said upper clamping plate's horizontal planar surface upon a vertical axis perpendicular to said upper clamping plate's horizontal planar surface, and said vertical axis is same said vertical axis of said fastener hole;

the cylindrical pivot seat defines a polar array of six ribs, which originate at the innermost radius of said second cylindrical side and project centrally upon a vertical axis and perpendicular to said upper clamping plate's horizontal planar surface to the outermost radius of said first cylindrical side; and the cylindrical pivot seat defines a concave surface, whereby said polar array of six ribs originate at said clamping plate's horizontal planar surface and extend vertically to said first cylindrical side's horizontal plane continuing upon a radial axis parallel to said radial axis of said semi-spherical projection to said horizontal plane of said second cylindrical side.

6. The camera mount as recited in claim 1, wherein said clamping mechanism's lower clamping plate further defines opposing horizontal planar surfaces by a first face and a second face which are parallel upon a vertical axis to a plane on a horizontal axis, said first face being said lower clamping plate's first horizontal planar surface, said second face being said lower clamping plate's second horizontal planar surface;

the lower clamping plate defines a hole upon a vertical axis along a centrally located horizontal axis and perpendicular to said lower clamping plate's horizontal planar surfaces for said threaded fastener to extend through;

the lower clamping plate further defines opposing sides by a first face and a second face which are parallel to a plane on horizontal axis, said first face being said lower clamping plate's first horizontal planar surface, said second face being disposed on a plane vertically below the plane of said first face, whereby said opposing sides define a notch therein which bears against the surface of the desired object said lower clamping plate is to be disposed upon;

the lower clamping plate's notch further defines a horizontal planar surface on a horizontal axis vertically below and parallel to said lower clamping plate's first horizontal planar surface;

the lower clamping plate's notch further defines mirrored angled surfaces by a first face and a second face which are mirrored upon a vertical axis centrally located upon a horizontal plane which is vertically below and parallel to the horizontal axis of said lower clamping plate notch's horizontal planar surface and said vertical axis being perpendicular to said lower clamping plate notch's horizontal planar surface, whereby said mirrored angled surfaces bear against the surface of the desired object said lower clamping plate is to be disposed upon; and the lower clamping plate's second horizontal planar surface further defines a cylindrical surface disposed upon a radial axis and said radial axis originates upon said horizontal axis of said lower clamping plate's said second horizontal planar surface, whereby said cylindrical surface bears against the surface of the desired object said lower clamping plate is to be disposed upon.

7. The camera mount as recited in claim 6, whereby said clamping mechanism's lower clamping plate is invertible to adapt to various objects.

8. The camera mount as recited in claim 1, whereby said coaxial threads allow cooperative engagement of said threaded fastener and said threaded knob; and the hexagonal fastener head and threaded knob, whereby cooperatively engaged define parallel cooperative surfaces perpendicular to said coaxial threads.

9. The camera mount as recited in claim 1, whereby said means for connecting the clamping mechanism to the support plate further comprises the cooperative engagement of the hexagonal fastener head and the concave surface of the semi-spherical pivot, the convex surface of the semi-spherical pivot and the concave surface of the support plate's semi-spherical projection, the convex surface of the support plate's semi-spherical projection and the concave surface of the upper clamping plate's cylindrical pivot seat, and the horizontal planar surface of the lower clamping plate and perpendicular surface of the threaded knob; and the threaded fastener extending through the coaxial holes in the semi-spherical pivot, the support plate's semi-spherical projection, the upper clamping plate, the lower clamping plate, and the threaded knob, whereby the support plate is rotatable to select angles relative to the support plate and compressive tension upon the clamping mechanism is adjusted by tightening or loosening the threaded knob, whereby the support plate with a camera secured thereon being attached to the clamping mechanism and the clamping mechanism being disposed upon the desired object and desired compressive tension being adjusted the support plate may be static or rotatable to select a desired angle, for the recording of images of flora, fauna, and participants in outdoors-recreational activities.

* * * * *